March 28, 1967 SHINOBU MAKINO 3,311,680
PROCESS AND APPARATUS FOR PELLETIZING POWDEROUS
MATERIALS BY VIBRATIONAL FORCES
Filed June 1, 1964 2 Sheets-Sheet 1
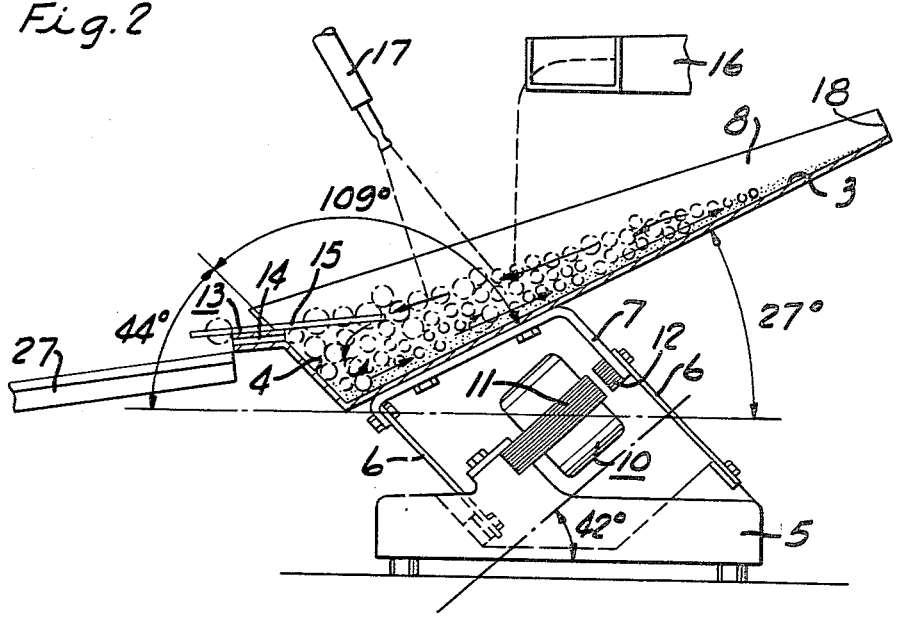
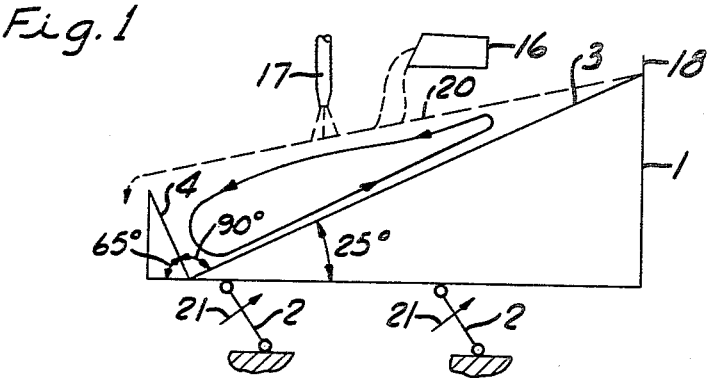
INVENTOR.
SHINOBU MAKINO
BY
*William H. Carothers*
HIS ATTORNEY March 28, 1967  SHINOBU MAKINO  3,311,680
PROCESS AND APPARATUS FOR PELLETIZING POWDEROUS
MATERIALS BY VIBRATIONAL FORCES
Filed June 1, 1964  2 Sheets-Sheet 2

INVENTOR.
SHINOBU MAKINO
BY
HIS ATTORNEY 3,311,680
PROCESS AND APPARATUS FOR PELLETIZING POWDEROUS MATERIALS BY VIBRATIONAL FORCES
Shinobu Makino, Tokyo, Japan, assignor to Shinko Electric Co., Ltd., Toba-shi, Japan
Filed June 1, 1964, Ser. No. 371,713
Claims priority, application Japan, June 4, 1963, 38/29,409
11 Claims. (Cl. 264—37)

This invention relates generally to method and apparatus for pelletizing material from powder form by vibrating forces.

Present methods and structures for pelletizing materials from powder form do not provide mechanical strength in the pellet. This is due to the low specific density of the pellet. It is loosely held together. It is very porous and these pores are even gaps within the pellet. Such a pellet is very friable and they lose their identity as a sphere and create fines that are undesirable in the process.

The method and apparatus comprising this invention produces a pellet that has a higher specific density and lower porosity giving it greater mechanical strength. Each pellet is harder, heavier, and more tightly held together resulting in the production of less fines through superior control in their use.

This answer to the problem is obtained by retaining the powder seeds and pellets confined within a container where they may be vibrated against each other and against the walls of the container. The application of hard vibratory force at high oscillatory speeds produces a dense, hard pellet. The high frequency forces may be obtained by rotary cranks or eccentrics driving a spring-supported trough. Such a vibratory system would have a frequency similar to that of the speed of an electric motor driving the cranks. If an alternating current rotary motor is used, the frequency will be somewhat less than half the alternating current frequency operating the motor. A rotary motor may be used to drive an eccentric weight to produce the vibrating forces. This may produce an elliptical vibratory movement if the spring system is made up of variable pneumatic pressure springs or helical springs. If flat cantilever springs are employed, the vibratory reciprocating path is guided to reciprocate in an arcuate path with either the crank or eccentric weight motor and their frequencies are the same as the motor r.p.m. Another form of vibratory motor is the pneumatic ball or rotary pneumatic motor, the frequencies of which may be varied. A popular vibratory motor is that of the electromagnetic type which has an electromagnetic field pulsating to drive an armature, which field is energized by a pulsating current such as an alternating current. If this motor is operated directly and the system is tuned within a few cycles of the intended reciprocation, it will operate at twice the frequency of the alternating current since each cycle represents two pulses. If the armature were polarized or if the field was fed through a diode, the frequency pulses would be the same as that of the alternating current. If controlled further by tubes or saturable reactors with diodes, then the frequency pulses could be made less than the alternating current supply frequency.

This range of frequency obtained from these different drives is relatively high as compared to that of the prior art, particularly when the material is confined within a container until it has grown to sufficient size to be discharged.

In carrying out this invention, a feeder trough is employed as the confining container. The same or varied feeding angles of the vibratory driving force relative to the trough bottom are employed. However, the whole feeder may also be tilted by changing the disposition of the spring seats on the feeder motor base or even by tilting the base. It may be tilted so high as to prevent the feeding of powderous material off the end. Thus, the angle of tilt functions as a barricade. The angle may be relatively low so as to require a scraper or a dam at the normally known discharge end which is a barricade.

This angularly disposed feeder has a trough bottom and back or end wall that diverge from each other. The feeding action causes the material to flow up the inclined trough bottom until the height attained causes the material to flow or be fed back down over itself. The same effect would be obtained if the feeder trough bottom was horizontal and had its opposed ends closed. The material will hit the end wall and then flow up and back over itself. The lower strata moving forward functions as a driver to feed the upper strata back over itself and thus continuously recirculating the material in a closed path. By tilting the trough upwardly, the trough bottom becomes a sloping end wall and the same circulation results; but here an opportunity is provided to employ spaced parallel bars or fingers that comb off the larger pellets from the returning upper strata and suspend them near their great diameter so that they may roll out over the back wall to discharge. These bars or rails are set on the top of the corrugations mounted on the top of the back wall of the feeder trough. Thus, the combination of the rod-like rails and the corrugations permit the spherical pellets suspended therebetween to roll back out of the trough to discharge even though these rods or rails have the same vibratory action as the trough bottom. The relative angle between the rearwardly and downwardly sloping rods and the angular disposition of the vibratory force are steeper and evenly distributed at a better feeding angle. Yet the large pellets will roll backward on a slope if supported near their great diameter.

The present invention efficiently produces pellets that have good strength because of the hard and vigorous hammering action produced by the vigratory reciprocation of the pellets against each other and against the oppositely sloping trough bottom and back walls of the upwardly tilted feeder which facilitates the growth of the pellets and at the same time pounds them on the hard inclined planes to produce a very dense, hard and strong pellet.

Other objects and advantages appear hereinafter in the following descriptions and claims.

The accompanying drawings show for the purpose of exemplification without limiting the invention or claims thereto, certain practical embodiments illustrating the principles of his invention wherein:

FIG. 1 is a diagrammatic view illustrating the operation of this invention.

FIG. 2 is a view in side elevation of a feeder with the trough in section to illustrate one form of vibratory motor and feeder trough for operating the apparatus.

Figure 4:
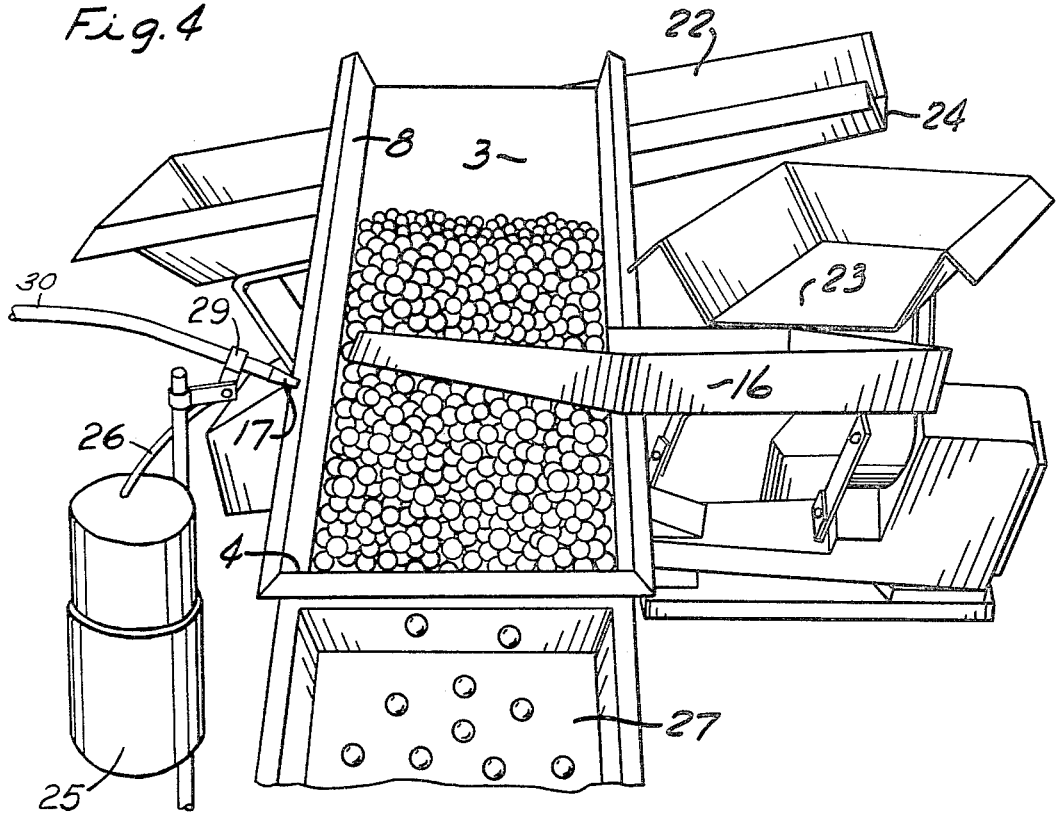
FIG. 4 is a perspective view of an actual application of the structure without the parallel rod structure at the top of the end wall but with a recirculating sysem of feeders.
Figure 3:
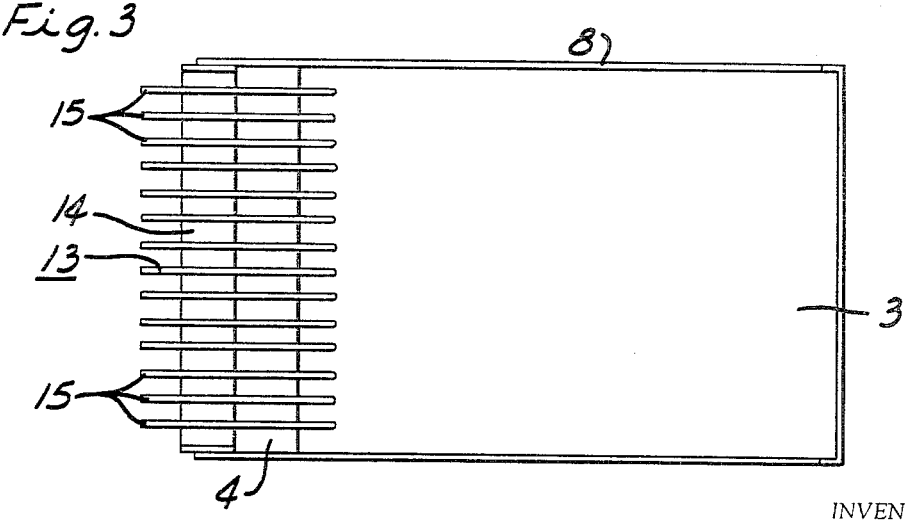
FIG. 3 is a plan view of the feeder trough shown in FIG. 2.

Referring to diagrammatic FIG. 1, the frame 1 is supported by the vibratory system indicated at 2 for reciprocating an inclined surface 3 sloping at an angle of approximately 25° and connected at its bottom and to an end or back wall 4 inclined in the opposite direction at an angle of approximately 65°. The angle of the slope for each of the two oppositely disposed surfaces 3 and 4 may be selected at many various angles depending upon the material to be balled. In FIG. 1, the angle between the trough floor 3 and the end wall 4 is 90° whereas in FIG. 2, it is approximately 109°. In FIG. 2 the trough and end wall are 27° and 44° respectively from the horizontal. The selection of these angles is made to produce the best pelletizing for the particular material in the shortest length of time.

The powderous materials are supplied from the feeder trough 16. The feed of these raw powderous materials is controlled to provide an optimum production of the pellets within a desired and controlled size at a given period of time. The binder for pelletizing the raw material is supplied in liquid form through a pressure system that is discharged by the nozzle 17 that directs its fluid mixture on the circulating mass between the trough bottom 3 and the back end wall 4. This mass travels generally in a closed continuous path as indicated by the arrow loop.

When feeding powderous material by vibratory reciprocation, the vibrations of the trough bottom 3 are effective on those particles that are immediately adjacent thereto. The mass of material moves forward and out of the trough when horizontal. If the material has considerable mass it will all flow out; if very light, only the bottom portion immediately adjacent the surface 3 flows and the degree of change is also determined on the shape and sizes of the material. The rougher cubical materials would be expected to carry more material forward than the small spherical particles of material. This is more effective as the inclination of the trough is increased. As the trough's angle increases the material ceases to flow from the trough if it is not provided with a barrier such as shown at 18, and then circulates in an endless path as indicated by the closed path of arrows. The scraper or barricade 18 may be placed at the normally discharge end of the trough to prevent any discharge of the finer particles of material. The top strata of this recirculating mass is indicated by the dotted line 20 which lies above the back or end wall 4 and the larger pelletized particles will flow back off the end wall 4 to discharge while the small particles churn and pound or recirculate with the circular moving mass to grow to a larger size.

A closed trough or an inclined vibratory reciprocating plane 3 actually circulates the material. The lower strata of the mass is moved by the vibratory action of the bottom 3 and is effective in moving in the usual direction along the trough and actually is also effective as a vibratory mass to feed the top strata of the mass rearwardly to form the closed circulatory path. The top portion is not merely falling—it is being positively fed rearwardly and the larger particles move back on the top to discharge.

The angle of the trough bottom 3 in FIG. 1 is approximately 25° from the horizontal. The angle of force of the vibratory motor means at 2 is indicated by the arrows 21 which lie at an angle steeper than that of the trough bottom 3. There are various kinds of feeder motors in the prior art. They may be in the form of an eccentric crank connected by a pivoted link to the trough or frame 1. The vibratory motor system 2 may be pivoted to change the trough slope. The trough may be supported on helical springs or rubber springs. The type and character of the motor is not important. It is selected to circulate the material to be treated in a manner that produces the best pelletizing effect.

As the material recirculates and the dampened fines grow into seeds that become larger, they continue to grow. The vibratory action of the bottom 3 and the end wall 4 as well as adjacent pellets aid in pounding additional fines on to the pellets in making them grow larger and finally sufficiently large enough to roll back off the top of the end wall 4 to discharge where they continue on their process in production.

In the structure of FIG. 2, the feeder motor is of the electromagnetic type wherein the heavy base 5 is mounted on resilient isolators and supports the cantilever springs 6 at an angle substantially the same inclination as the back wall 4. These springs 6 are bolted at one end to the base 5 and at their other end to the heavy stock frame 7 having a short rear leg and a longer front leg which determines the degree of slope of the bottom 3 of the feeder, the angle of which is less than that of a plane normal to the parallel springs 6 or the vibratory foces. The angle of a plane normal to the springs 6 is steeper and greater by approximately 15° than that for the bottom 3 of the feeder. This is the feeding angle of the reciprocating vibratory movement of the vibratory feeder motor the electromagnet 10 of which includes a coil to be energized by fluctuating current and is placed on a core 11 mounted on the base 5 and cooperates through an air gap with the armature 12 secured to the frame 7 and movable as a unit with the feeder trough 8 secured thereto by bolts as shown. When the electromagnet is energized by alternating current supplied through a diode to operate at a frequency equivalent to that of the alternating current supply and the springs 6 are tuned with the mass being vibrated to provide a swing system that has a natural period slightly less than the frequency of the driving current, the feeder will function to circulate the material in the path indicated by the broken arrows. The hammering action of the bottom 3 and the wall 4 and the reaction between the pellets themselves cause them to grow until they will ride on the top of the parallel discharge device 13 with rods or fingers 15 that are mounted on the apex of each of the corrugations 14 situated on the top of the wall 4. The fingers have a slight slope so that the balled or pelletized product slowly rolls back and against the feeding action on those rods, and are discharged onto the awaiting tray 27. The fingers 15 extend inwardly to immerse their leading ends in the upper strata to intercept the large pellets and cause them to roll back. If they are very large, they may not want to roll back because of the feeding action imparted to these rod-like fingers. If the pellets are smaller and of just the diameter to be held by these fingers as shown, they will roll back in spite of the feeding action on the rod-like fingers.

The feeder 16 discharging the raw material to the trough bottom 3 does so at approximately the center of gravity of the vibratory system.

The scraper, or barricade, 18 of FIG. 1 is not provided in FIG. 4 because the seeds may be discharged off the end of a trough 8 to the trough 22 and circulated to the trough 23 that discharges to the feeder supply trough 16. This circular feeder path is shown in FIG. 4 and the feeder 23 is the trough most likely to receive the raw material from a hopper (not shown) which may be filled when necessary while the pelletizing machine operates continuously.

The binder spray is discharged through the nozzle 17. This may be any desirable binder liquid. Water is frequently used when it will function to pelletize in harmony with any further portion of the process in which these products are used. Water with polyhudane solution or a starch paste solution or a dextrin solution or any others known in the art may be used as a suitable binder. As shown in FIG. 4, the solution is placed in the open container 25 which is connected by the tube 26 to the suction opening to a venturi 29 supplied by a fluid under pressure such as water or air. The fluid passing through the venturi 29 from the conduit 30 creates a suction and the atmospheric pressure on the liquid solution in the container forces it through the tube 26 and into the fluid discharge nozzle 17. This air-borne liquid binder is atomized and covers the raw material wetting the same as it moves down over the top of the circulating mass and the smaller and finer particles adhere thereto and are hammered into the pellet when engaging other pellets on the back wall 4 or the trough bottom 3. The smaller particles are knocked together and form large seeds or seeds may be placed in the trough to grow into larger pellets.

As the material is circulated, the particles moving down in the top layer toward the back wall 4 are sprinkled with fresh raw material powder together with a binder and when they are larger they are made to roll against the terminal back wall 4 and are pounded and hardened by the strong vibratory action of the wall 4 and the pressing of other particles. The particles grow until they come on top of the rod-formed parallel rails 15 and can be rolled out over the top of the wall 4 to the tray 27. The advantage of the present invention lies in that the particles and powders are made to circulate forming thicker layers making them grow on the inclined plane then move with the upper layer and the lower layer traveling in opposite directions to each other. Such particles are made to grow efficiently and effectively by this vibratory pounding action on the bottom and end inclined planes. The pellets thus formed exhibit greater mechanical strength than those formed by prior methods and structures. The formation and growth of particles are rapid and efficient and the structure of the machine is very simple.

I claim:

1. The method of continuously pelletizing powders by vibratory forces including the steps of supporting, for vibratory reciprocation in a predetermined arcuate path, upwardly inclined surfaces extending in opposite directions from a common juncture, feeding a powderous material to one inclined surface, subjecting the material to vibrations imparted to the inclined surfaces to continuously circulate the material in a closed path extending up one inclined surface and back over itself downwardly to the other inclined surface, supplying a liquid binder to the flowing powders to agglomerate and build them into hard pellets due to the hammering action produced by the vibratory reciprocation of the developing pellets against the vibratory inclined surfaces and against each other, selectively intercepting pellets of predetermined size from the top of the downwardly moving material for discharge.

2. The method of claim 1 characterized in that the interception step includes selectively combing the pellets in the top layer of the downwardly moving material to distract the larger pellets for discharge.

3. The method of claim 1 which also includes the step of disposing the upwardly inclined surfaces to permit direct discharge of some of the material moving up the inclined surface and recirculating the material so discharged with the powders of the material being fed to one inclined surface.

4. The method of claim 1 which also includes the step of blocking the discharge of materials moving up the inclined surface to insure its recirculation in the closed path extending up one inclined surface and back over itself to the other inclined surface.

5. The method of continuously pelletizing powders by vibratory forces which consists of the steps of supporting for vibratory reciprocation in a predetermined arcuate path upwardly inclined surfaces extending in opposite directions from a common juncture, feeding a powderous material to one inclined surface, supplying a liquid binder to the fed material, applying vibratory forces to the inclined surfaces to bring about a continuous circulation of the material in a closed path extending up one inclined surface and back over itself downwardly to the other inclined surface to cause the material to agglomerate and build into hard pellets, selectively intercepting pellets of predetermined size from the top of the downwardly moving material for discharge.

6. The method of claim 5 which also includes the step of adjusting the inclination of the inclined surfaces to control and obtain the desired size of pellets.

7. A continuous pelletizing structure including a vibratory trough having an inclined bottom and back and side walls, means to support said vibratory trough for vibratory reciprocation in a predetermined arcuate path, vibratory motor means to reciprocate said vibratory trough, means to feed a powderous material to the inclined trough bottoms, means to supply liquid binder to the powderous material to agglomerate and build the powderous material up into hard pellets by hammering action produced by said vibratory reciprocation, said support means including said trough bottom to produce a continuous circulation of the material in a closed path extending up said inclined trough bottom wall and back over the material per se downwardly to said back wall, and interception means on said back wall to selectively receive and discharge formed pellets of predetermined size from the top of the downwardly moving material in the closed continuously circulating path.

8. The structure of claim 7 characterized in that said interception means comprises parallel spaced fingers with their outer ends extending into said trough for immersion in the upper strata of the downwardly moving material.

9. A continuous pelletizing structure including a vibratory trough having a bottom and back and side walls, means to support said vibratory trough for vibratory reciprocation in a predetermined arcuate path, vibratory motor means to reciprocate said vibratory trough, means to feed a powderous material to said vibratory trough, means to supply liquid binder to the powderous material to agglomerate and build the powderous material into hard pellets by hammering action produced by said vibratory reciprocation, interception means on said back wall of said trough to selectively withdraw formed pellets of predetermined size from said trough, and means to produce a continuous circulation of the material in a closed path extending to the front of the trough and upwardly and back over the material per se downwardly to the back wall and forwardly along the trough bottom to form pellets.

10. The pelletizing structure of claim 9 in that said last means includes a barricade at the front of the trough to prevent discharge and produce the circulating continuous path of the material.

11. The pelletizing structure of claim 9 in that said last means includes a structure in the support to slope the trough to a selected degree to function as a barricade in recirculating the specific materials in a continuous path to promote pelletizing.

References Cited by the Examiner
UNITED STATES PATENTS

| | | | |
|---|---|---|---|
| 2,553,714 | 5/1951 | Lucas | 264—117 |
| 2,836,846 | 6/1958 | Meyer | 18—1 |

ROBERT F. WHITE, *Primary Examiner.*

J. R. HALL, *Assistant Examiner.*